(12) United States Patent
Gayowsky et al.

(10) Patent No.: US 7,869,178 B2
(45) Date of Patent: Jan. 11, 2011

(54) AUGMENTATION OF AMBIENT TEMPERATURE AND FREE CONVECTION EFFECTS IN THERMAL CIRCUIT BREAKER TRIP CURVE APPROXIMATIONS

(75) Inventors: Ted J. Gayowsky, Toronto (CA); Yang Ye, Mississauga (CA); Zhenning Z. Liu, Mississauga (CA); Randy J. Fuller, Hillsburgh (CA)

(73) Assignee: Honeywell International Inc., Morristown, NJ (US)

( * ) Notice: Subject to any disclaimer, the term of this patent is extended or adjusted under 35 U.S.C. 154(b) by 588 days.

(21) Appl. No.: 11/938,693

(22) Filed: Nov. 12, 2007

(65) Prior Publication Data

US 2009/0122454 A1 May 14, 2009

(51) Int. Cl.
*H02H 5/04* (2006.01)
(52) U.S. Cl. ...................................... 361/103
(58) Field of Classification Search .................. 361/103
See application file for complete search history.

(56) References Cited

U.S. PATENT DOCUMENTS

| | | | | |
|---|---|---|---|---|
| 3,967,188 | A * | 6/1976 | Spencer | 323/367 |
| 4,584,525 | A * | 4/1986 | Harnden et al. | 324/126 |
| 5,898,557 | A | 4/1999 | Baba et al. | |
| 7,675,721 | B2 * | 3/2010 | Elms | 361/42 |
| 2005/0047043 | A1 | 3/2005 | Schweitzer et al. | |
| 2007/0014066 | A1 | 1/2007 | Ye | |

FOREIGN PATENT DOCUMENTS

| | | |
|---|---|---|
| DE | 10257425 | 6/2004 |
| JP | 10068754 | 3/1998 |

OTHER PUBLICATIONS

European Search Report dated Dec. 9, 2009.

* cited by examiner

*Primary Examiner*—Ronald W Leja
(74) *Attorney, Agent, or Firm*—Oral Caglar, Esq.

(57) ABSTRACT

An electrical overload protection system may be based on a solid state control system. A solid state switch may open responsively to commands for a solid-state controller. The controller may perform calculations to determine accumulated energy in a protected conductor. The calculations may be based, in part, on samplings of current in the protected conductor and ambient temperature to which the conductor may be exposed.

14 Claims, 7 Drawing Sheets

AUGMENTATION OF AMBIENT TEMPERATURE AND FREE CONVECTION EFFECTS IN THERMAL CIRCUIT BREAKER TRIP CURVE APPROXIMATIONS

BACKGROUND OF THE INVENTION

The present invention is in the field of protection of electrical conductors from damaging electrical overloading and, more particularly, providing such protection with solid-state power controllers (SSPC's).

In certain electrical power distribution systems, traditional thermal circuit breakers are being replaced with SSPC circuit protection. SSPC circuit protectors may be provided with periodically sampled data relating to current flow in a conductor and may then perform periodic calculations based on the data. A product of each of the calculations is compared with a tripping threshold to determine if current should be interrupted to prevent damage. The tripping threshold is derived from a simulation of traditional bimetallic thermal circuit breaker characteristics.

Industry wire-protection safety standards are based on characteristics of traditional thermal circuit breakers. For example, an industry standard may specify that if an insulated 14 gauge wire is exposed to a current of 20 amps for a period of 10 seconds then a 15 amp thermal circuit breaker should trip. The majority of existing aircraft loads are also designed to comply with such a standard. A bimetallic element within a thermal circuit breaker acts as an energy storage device. When accumulated energy within the breaker reaches a particular value, it trips. Trips at various electricity input levels, as a function of time, may be plotted as a constant energy trip curve.

As a result SSPC circuit protectors are often designed so that they perform comparisons against a continuum of parameters that simulate, as close as possible, the parameters of industry standards. In that regard, the SSPC circuit protectors may be considered to operate with a "simulation trip curve" that simulates a thermal circuit breaker trip curve. As a first approximation for a simulation trip curve, prior-art SSPC circuit protectors have employed a relationship $i^2t$, where i is current and t is time. This relationship provides a simulation trip curve that corresponds in many but not all respects to a thermal circuit breaker trip curve. A typical mismatch of the prior-art trip curves may be illustrated in graph 100 in prior-art FIG. 1.

Figure 1:
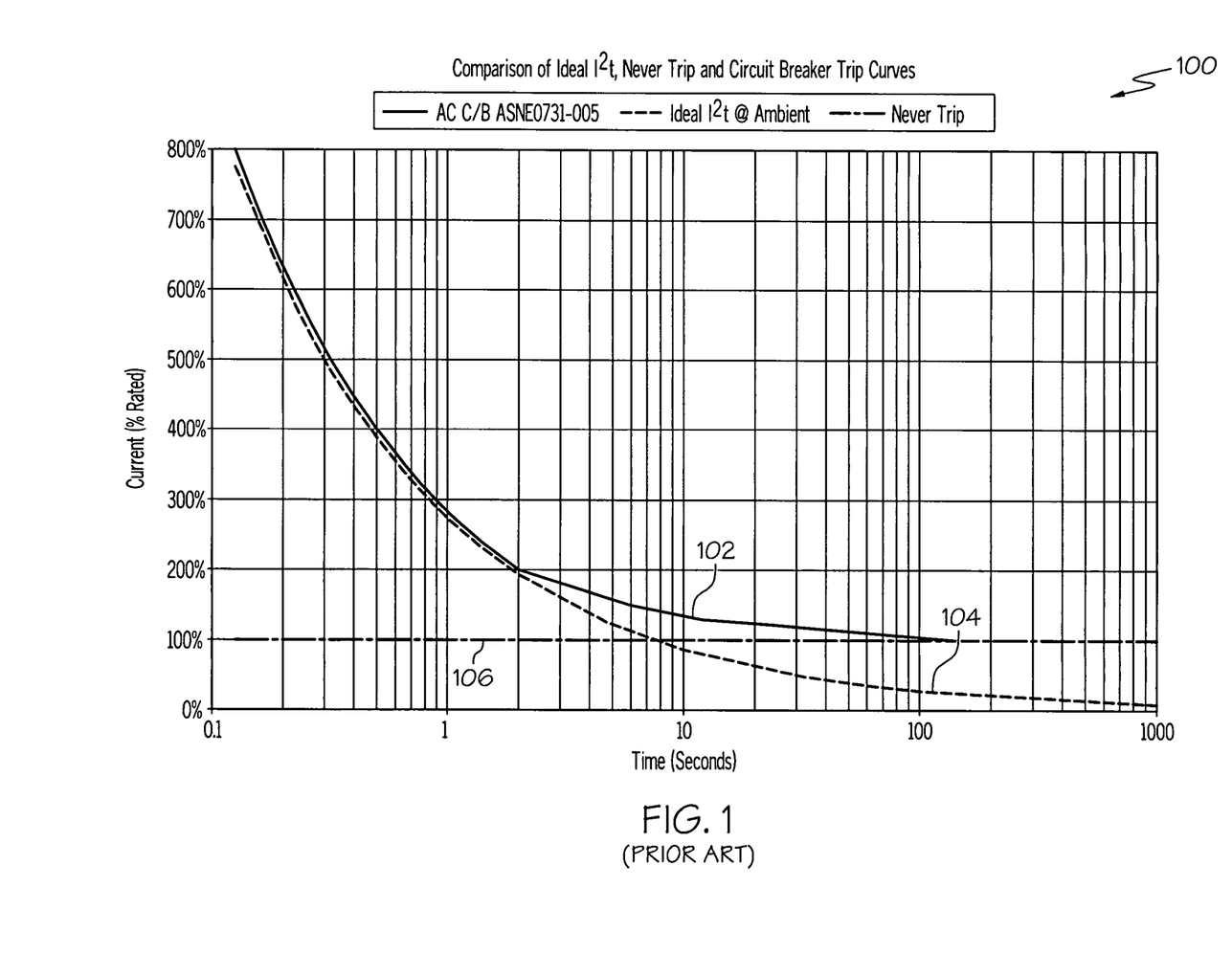
FIG. 1 is graph showing a relationship between characteristics of prior-art circuit protection systems.

In FIG. 1, the prior-art simulation trip curve 102 may represent an energy balance between heat generated within a conductor due to electrical resistance and the energy leaving the conductor to an ambient environment. In very short times (t<2 sec), heat generation effects ($i^2t$) dominate and the prior-art simulation trip curve 104 closely follows the thermal circuit breaker trip curve 102. At very long times, a steady state "Never Trip" threshold is achieved at (t>100 sec). However, in an intermediate time frame (2<t<100 sec), convection heat flows may have a bearing on how much energy accumulates in the conductor. The simulation trip curve 104 based on $i^2t$ modeling does not take account of convection heat transfer. As a result the curves 102 and 104 may diverge.

This divergence presents several problems. The first is that a gap is created between the protection provided by a thermal circuit breaker and an SSPC circuit protector that is based on the simple $i^2t$ model. Specifically the gap develops in the 2<t<100 sec time frame. A load which lies in the region bounded by the $I^2t$ curve 104, a Never Trip line 106 and the thermal circuit breaker trip curve 102 may cause opening of an SSPC circuit protection switch. A protection switch would remain closed if the circuit were protected by a traditional thermal circuit breaker. In other words, load in the bounded region above described may cause nuisance trips.

The second problem is one of modelling a correlation between trip curves 102 and 104 as a function of ambient temperature. Due to the fact that a thermal circuit breaker will absorb more energy at colder ambient temperatures and less at hotter ambient temperatures, the thermal circuit breaker trip curve 102 may shift to the left as ambient temperatures rise and to the right as they drop. Correlation of these effects may provide for optimum sizing of wire and thermal circuit breaker combinations. But such correlation is not readily achievable when the simple $I^2t$ model is used for the simulation trip curve 104.

Simple $i^2t$ trip curve models are established with no dependence on ambient temperature. Therefore, in order to ensure that industry safety standards are not compromised, wire sizes must be selected based on the hottest ambient temperature to which a wire may be exposed. The effect is that a wire size used in a circuit element with prior-art SPPC circuit protection may be larger than a wire size for an equivalent circuit element protected with a thermal circuit breaker.

Various attempts have been made in the prior-art to refine modeling techniques for simulation trip curves. One such technique is disclosed in US Patent Application 2007/0014066. In this disclosure, a first-order thermal model of a wire is used as a basis for determining when and if current should be interrupted within the wire. The thermal model analyzes conduction-based heat flow, but it does not take into consideration radiation and convection heat flows.

As can be seen, there is a need to provide an SSPC based circuit protection system that may operate with characteristics that are in close correspondence with those of a thermal circuit breaker. Additionally, there is a need to provide such a system that takes into account ambient temperature condition in which a protected circuit element operates.

SUMMARY OF THE INVENTION

In one aspect of the present invention, an apparatus for providing electrical overload protection for a conductor comprises a controller for providing a switch-opening command based on calculations that are a function of ambient temperature to which the conductor is exposed.

In another aspect of the present invention, a solid-state electrical overload protection system comprises a solid-state switch for interrupting current in a protected conductor, a solid-state trip engine, a current sensing circuit for sensing current in the protected conductor and for providing current data to the trip engine, a temperature sensing circuit for sensing an ambient temperature to which the protected conductor is exposed and for providing temperature data to the trip engine. The trip engine is interconnected with the solid-state switch and the trip engine is configured to produce switch opening commands to the solid-state switch based on an algorithm that accounts for the sensed current and the sensed ambient temperature.

In still another aspect of the present invention, a method for providing electrical overload protection for a conductor comprises the steps of performing calculations that are a function of ambient temperature to which the conductor is exposed and providing a switch-opening command based on the calculations.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful for providing protection from circuit overloading. More particularly, the present invention may provide an SSPC based circuit protection system with characteristics that closely approximate characteristics of thermal circuit breakers. The present invention may be particularly useful to optimize wire sizes in vehicles such as aircraft in which reduction in wire weight may be advantageous.

In contrast to SSPC based circuit protection systems, among other things, the present invention may employ circuit protection parameters that are based, in part on convection effects and ambient temperatures to which a protected conductor may be exposed. The present invention may utilize, instead of a simple prior-art $I^2t$ algorithm, an algorithm that incorporates convection and ambient temperature factors to determine if current should be interrupted because of excessive loads.

Figure 2:
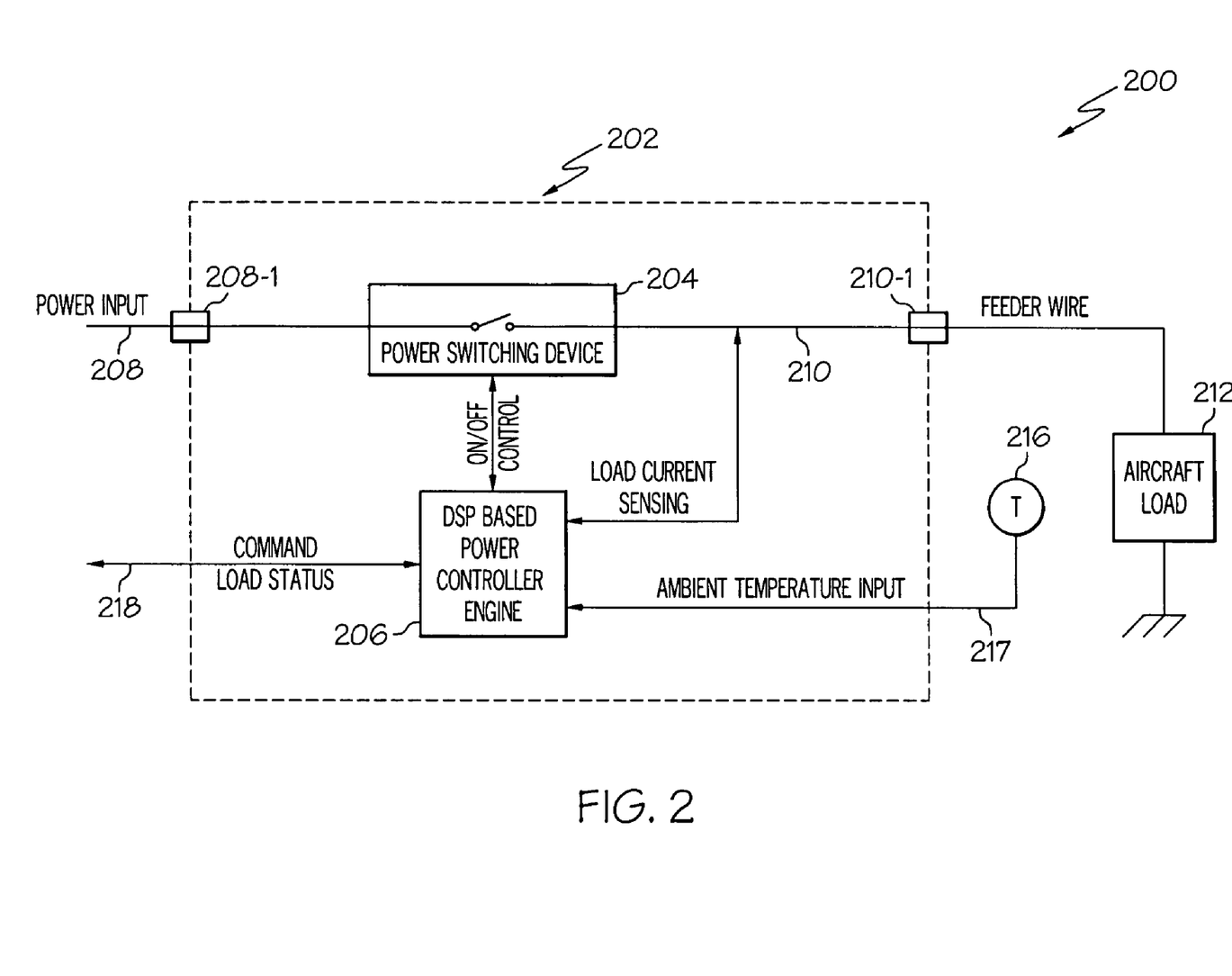
FIG. 2 is a block diagram of a circuit protection system in accordance with the invention.

Referring now to FIG. 2, a block diagram illustrates an exemplary circuit protection system designated generally by the numeral 200 which may be employed in a vehicle such as an aircraft or other aerospace vehicle. The system 200 may incorporate a solid-state power control system or SSPC 202. The SSPC 202 may comprise a solid-state power switch 204 and a power controller which may be referred to as a power controller engine or trip engine 206. The trip engine 206 may be interconnected with the power switch 204 and may command the power switch 204 to open or close. A power conductor 208 may be interconnected with the switch 204 through a power input 208-1. A feeder wire 210 may interconnect with the switch 204 and an electrical load 212 through a feeder output 210-1.

The feeder wire 210 may be interconnected with the trip engine 206 through a current sensing circuit 214. A temperature sensor 216 may be interconnected with the trip engine 206 through a temperature sensing circuit 217. The sensor 216 and the sensing circuit 217 may provide data relating to ambient temperature to which the feeder wire 210 is exposed.

A feedback circuit 218 may be interconnected with the trip engine 206 to provide reporting to a load management system (not shown) of the aircraft.

The trip engine 206 may be a microprocessor such as a digital signal processor (DSP). The trip engine 206 may receive data relating to current level in the feeder wire 210. The trip engine 206 may also receive data relating to ambient temperature to which the feeder wire is exposed. Periodic calculations may be performed within the trip engine to determine if the feeder wire 210 is being exposed to electrical overloading. The calculations may be based on samplings of current and ambient temperature data. In the event of electrical overloading, the trip engine 206 may produce a command to open the power switch 204.

Electrical interactions between the trip engine 206 and the power switch 204 may be performed in a manner familiar to those skilled in the present art. One particularly effective method of performing such interaction is disclosed in US Patent Application 2007/0014066 which is incorporated herein by reference.

It may be seen that the SSPC 202 may perform a circuit breaker function for the feeder wire 210 or any other conductor or circuit element that may be interconnected with the switch 204. In that respect, it is desirable that the SSPC 202 perform its circuit breaker function in a manner that emulates a traditional bimetallic thermal circuit breaker (not shown). This desirable functionality of the SSPC 202 may be provided by utilizing a calculation method based on the following analysis.

Figure 3:
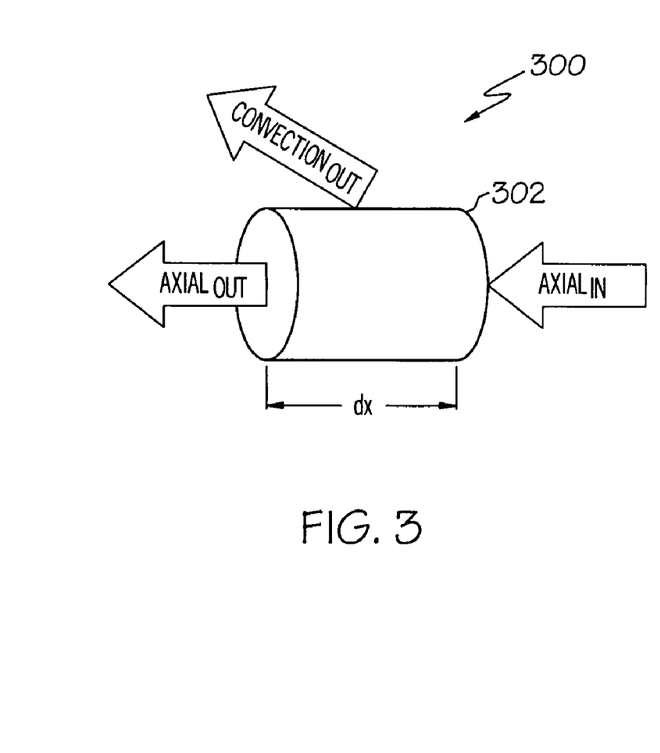
FIG. 3 is diagram of an energy balance analysis in accordance with the invention.
Figure 4:
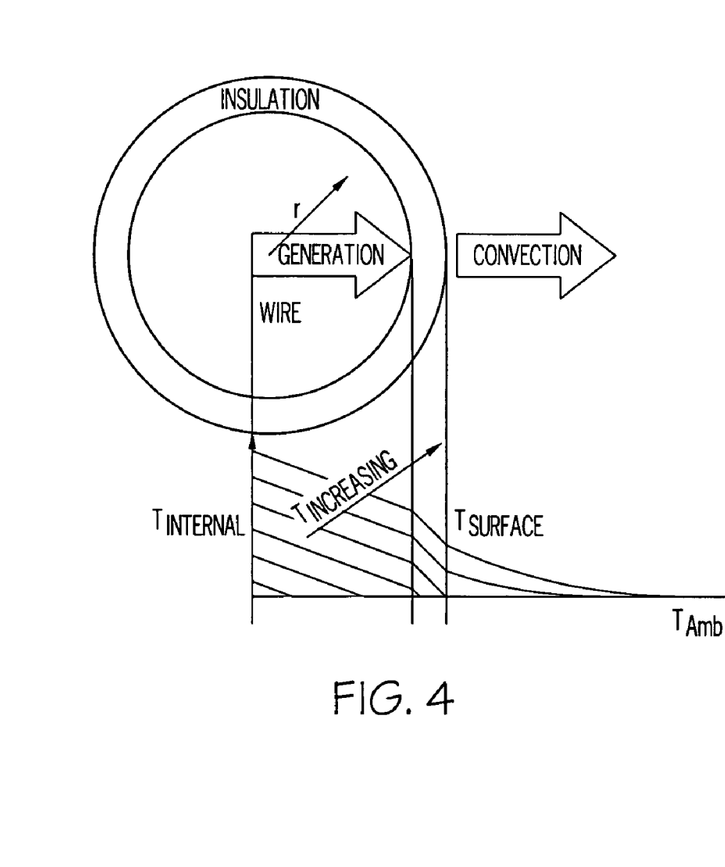
FIG. 4 is diagram of a radial energy balance analysis in accordance with the invention.

Referring now to FIGS. 3 and 4, an energy balance diagram 300 for a differential length of wire 302 is presented below. Energy balance may be expressed as:

$$\text{Energy}_{Stored} = \text{Energy}_{In} - \text{Energy}_{Out} \tag{2}$$

where:

Energy$_{Stored}$=Energy Generated by Resistance to Electricity Flow;

Energy$_{In}$=Axial Conduction; and

Energy$_{Out}$=Axial Conduction+Radial Convection.

Assuming that a temperature gradient across the differential length of wire 302 is negligible, the axial conduction terms cancel out. The energy balance equation then reduces to a two dimensional problem as illustrated in FIG. 4.

Further assuming that a thermal circuit breaker trip curve represents an energy balance, such that all energy generated within the wire through electrical resistance heating must leave through convection across the differential wire surface; and still further that, for simplicity purposes, the wire is assumed to be at an essentially constant temperature, equation 2 may be restated as equation 3:

$$\frac{i^2 * t}{K_{Amb}} = hA_S(T_S - T_{Amb}) \tag{3}$$

Where:

i=Electrical Current (% of Rated Load);

t=time (sec);

$K_{Amb}$=Electrical Resistance Constant as a non-dimensional function of area;

$hA_S$=Convection Coefficient as a non-dimensional function of surface area;

$T_S$=Wire Surface Temperature (K); and $T_{Amb}$=Ambient Temperature (K).

It may be seen that from observed thermal properties of matter, it is expected that the electrical resistance constant will be inversely proportional to the reference temperature at which it was determined, per equation 4:

$$K_{Amb} = \frac{T_{Amb} * K_{Ref}}{T_{Ref}} \qquad (4)$$

Where $K_{Ref}$ is the Electrical Resistance Constant at the reference temperature $T_{Ref}$.

From analysis of existing thermal circuit breaker trip curves, $i^2t/K_{Amb}$ may be correlated with the convection effect to derive an equation for $T_S$. Note that $K_{Amb}$ may be constant for a given ambient temperature.

At ambient (293° K), and t=90 sec:

$$13.0 = hA_S(T_{S90} - T_{Amb}) \qquad (5)$$

At ambient (293° K), and t=100 sec:

$$14.3 = hA_S(T_{S100} - T_{Amb}) \qquad (6)$$

It may be further assumed that $T_S$ at 90 sec is 0.1° C. less than $T_S$ at 100 sec (i.e.: the surface temperature increases with time):

$$T_{90s} = T_{100s} - 0.1° C. \qquad (7)$$

Using equation 7 to solve equations 5 and 6 for $hA_S$ at ambient:

$$hA_S = 13.3 \qquad (8)$$

Note that the convection constant, hAs, may be constant with time and a function of $\Delta T$ only, where $\Delta T = Ts - Tamb$.

The above solutions for $K_T$ and $hA_{SAmbient}$ may now be substituted into Eqn. 3 to solve for $T_S$.

$$T_S = \frac{i^2 t}{K_{Amb} * hA_S} + T_{Amb} \qquad (9)$$

Solving for $Ts_{Amb}$ may yield:

$$T_{S25C} = 0.0103t + 298.08 \qquad (10)$$

Equation 10 may be generalized to:

$$T_{S\,amb} = 0.0103t + T_{amb} + 0.08 \qquad (11)$$

Due to the dependence of $K_{Amb}$ on ambient temperature, a rate of change of the surface temperature may become a linear function of ambient temperature. Therefore, a rate of change of the surface temperature, as a function of surface temperature is:

$$m_{Amb} = 3.38E-5 * T_{Amb} - 8.62E-5 \qquad (12)$$

The net result of the above is that Eqn. 3 may be restated as:

$$\frac{i^2 * t}{K_{Amb}} = hA_S(m_{Amb} * t + 0.08) \qquad (13)$$

Where:

$K_{Amb}$=equation 4;

$hA_S$=equation 8; and $m_{Amb}$=equation 12.

Solving for I and plotting the results of the above yields results may be plotted in FIG. 6 which is described hereinbelow.

An expression of accumulated energy as function of dt may be expressed as:

$$\frac{1}{0.08 * hA_S} \times \frac{\int (i^2 - hA_S * m_{Amb})dt}{K_{Amb}} \qquad (14)$$

Equation 14 may be implemented in discrete form and solved numerically in the trip engine 206 of FIG. 2. When the equation 14 is solved repetitively thermal memory effects are incorporated in the results.

Figure 5:
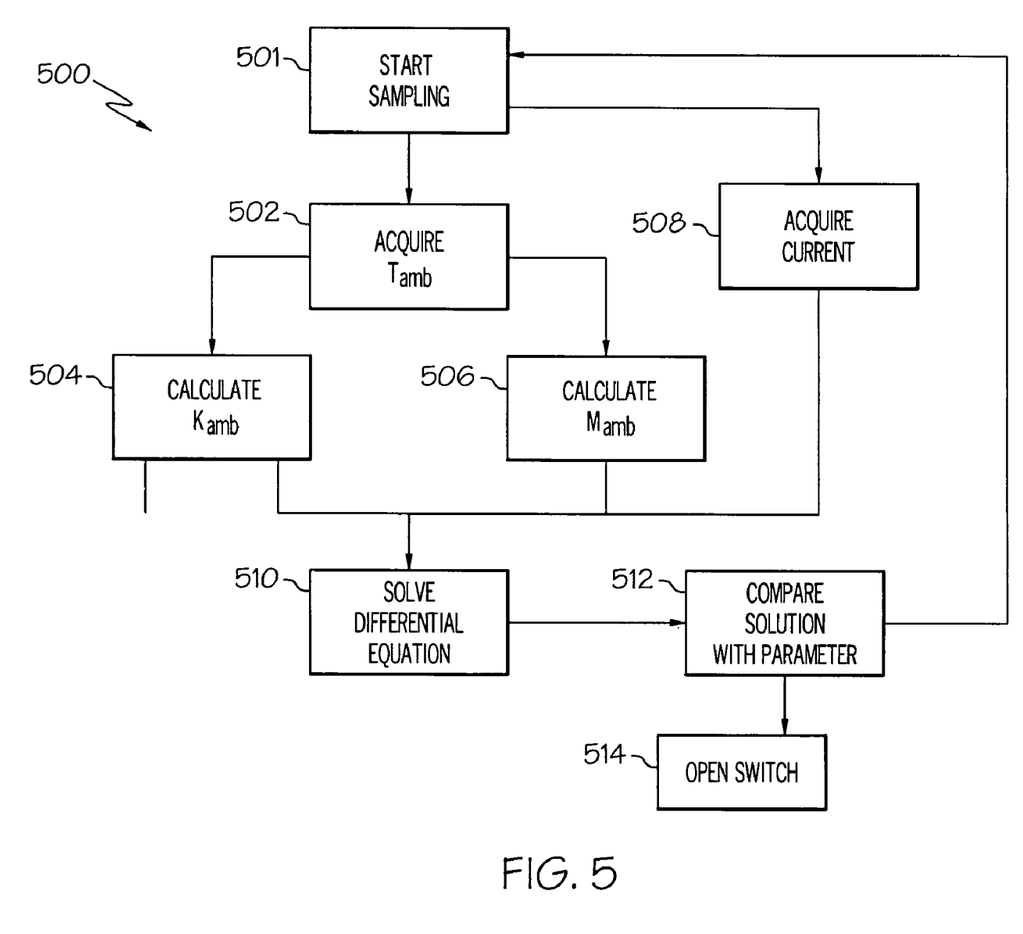
FIG. 5 is a method for providing circuit protection in accordance with the invention.

A method for implementing the solution of equation 14 may be understood by referring to FIG. 5. A method 500 may employed to provide circuit breaker functionality with characteristics that may closely emulate characteristics of thermal circuit breakers. In a step 501 sampling may be initiated (e.g. by the trip engine 206). In a step 502, $T_{Amb}$, in ° K, may be acquired (e.g. with the temperature sensor 216). In a step 504, a calculation may be performed to solve for $K_{Amb}$ (e.g. by solving Equation 4). In a step 506, a calculation may be performed to solve for $m_{Amb}$ (e.g. by solving Equation 12).

In a step 508, current in a feeder wire may be determined (e.g., by the current sensing circuit 214). In a step 510, the differential equation 14 may be solved. In a step 512 a result of step 510 may be compared to a tripping threshold (e.g., consistent with a representative steady-state thermal circuit breaker trip limit, 120% overload). In a step 514, current may be interrupted in the feeder wire if accumulated energy, as determined in step 510, exceeds the steady state trip parameter. In the step 501, the method 500 may be re-started if accumulated energy, as determined by equation 14 is not excessive.

Figure 6:
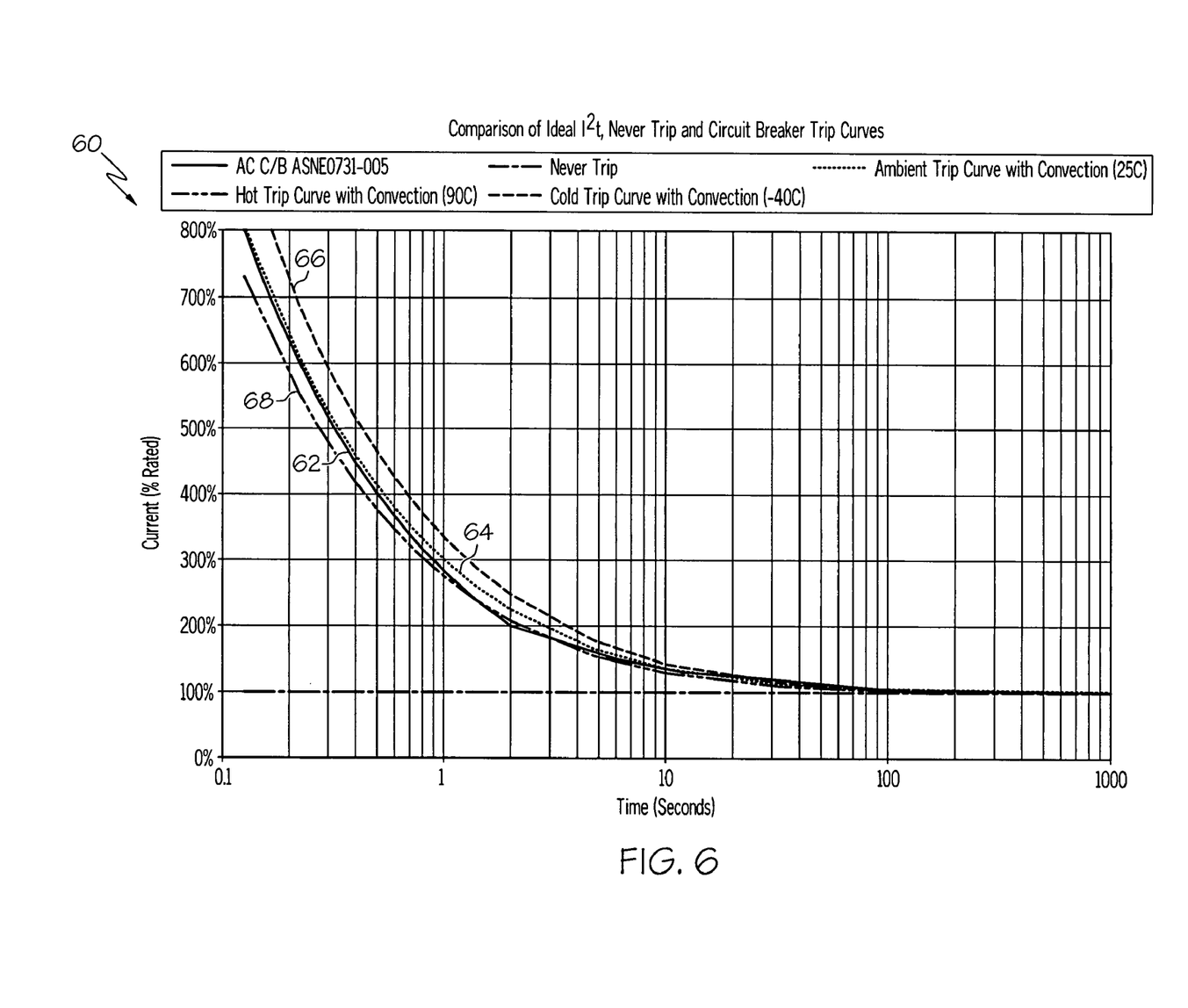
FIG. 6 is a graphical plot of an analysis performed in accordance with the invention.

Referring now to FIG. 6, simulation trip curves are illustrated on a graph 60 in a form that may result from plotting tripping events as they may occur in accordance with the method 500. A curve 62 may represent characteristics of a thermal circuit breaker. A curve 64 may represent a trip curve derived by the method 500 for convection occurring at 25C. A curve 66 may represent a trip curve derived by the method 500 for convection occurring at −40 C. A curve 68 may represent a trip curve derived by the method 500 for convection occurring at 90 C. It may be seen the all of the curves 64, 66 and 68 may closely approximate the characteristics of the thermal circuit breaker curve 62. There is very little, if any divergence of the curves in a time period 2<t<100 seconds. This may be compared with a substantial divergence in the 2<t<100 second time period as illustrated in prior art FIG. 1.

As a consequence of improved matching of trip curve characteristics, conductor sizing may be optimized because ambient temperature effects are taken into account. This may be particularly important in aircraft that use high power levels. Avoidance of oversized wire may contribute to a desirable control of weight of an aircraft. Additionally, nuisance trips in the 2<t<100 second period may be eliminated because convection effects are better accounted for.

Figure 7:
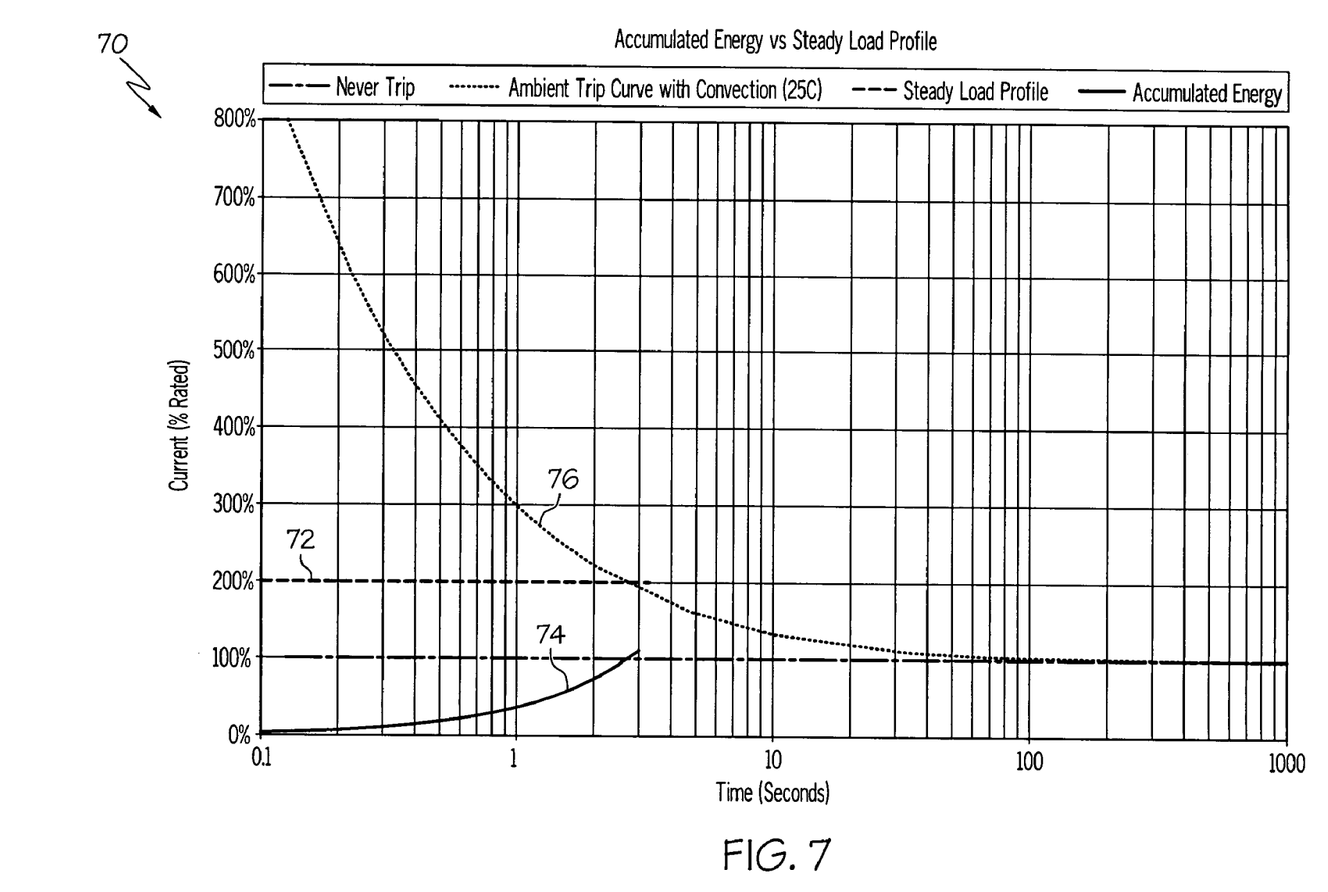
FIG. 7 is a graphical plot illustrating a first functional behavior of the circuit protection system in accordance with the invention.

The present invention may take accumulated energy into account. This may be understood by referring to FIGS. 7 and 8. In FIG. 7, a graph 70 may portray a trip curve 76, an overload line 72 and an energy accumulation curve 74. It may be seen that the overload line 72 may represent a steadily applied 200% overload. The accumulated energy curve 74 may be a graphical representation of accumulated energy within a protected conductor or wire. It may be seen that the overload line 72, which may be a product of only time and current, may cross the trip curve 76 at a time earlier than a potential crossing of the trip curve 76 by the accumulated energy curve 74. Thus, the present inventive circuit protection system 200 of FIG. 2 may safely provide for a period of allowed operation that may exceed a period based on a crossing of the trip curve 76 by the straight line 72.

Figure 8:
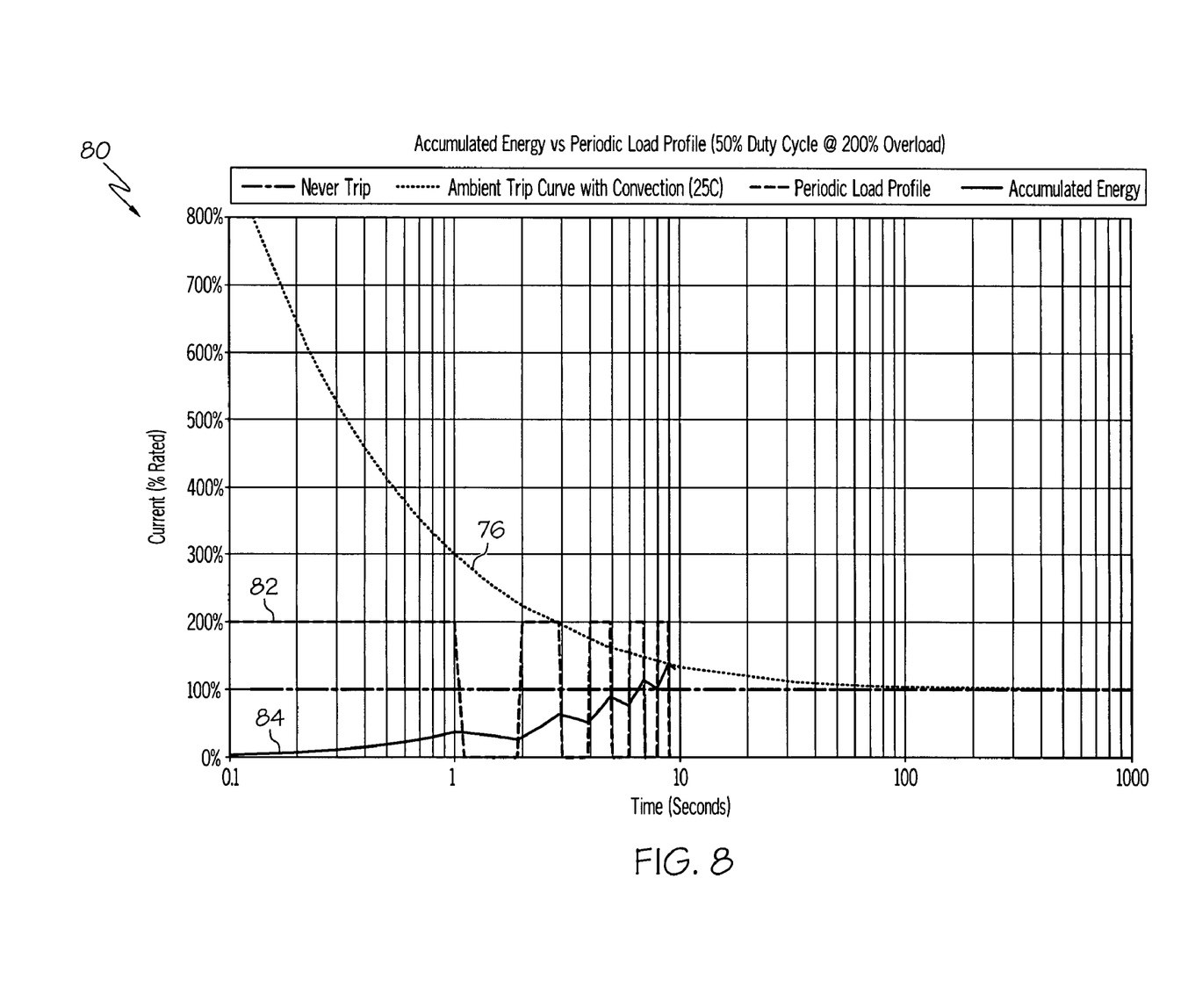
FIG. 8 is a graphical plot of a second functional behavior of the circuit protection system in accordance with the invention.

This advantageous feature of associating tripping with accumulated energy may be further illustrated FIG. 8. In FIG. 8, a graph 80 portrays the trip curve 76, a discontinuous overload plot 82 and an accumulated energy plot 84. The overload plot 82 may represent a 200% overload applied with a 50% duty cycle. The accumulated energy plot 84 may reflect a rise in accumulated energy during momentary application of the overload. The plot 84 may also show a decrease in accumulated energy during periods when the overload is not applied. It may be seen that the cumulative energy plot 84 crosses the trip curve 76 in about nine seconds whereas the overload plot 82 crosses the trip curve 76 in at about one second.

It may be seen that the feeder wire 210 of FIG. 2 may be protected from accumulation of excess energy due to electrical overloading by application of the method 500 as graphically illustrated in FIGS. 7 and 8. But current may not be interrupted merely because of momentary excessive currents in the feeder wire 210. Tripping based on accumulated energy may a particularly advantageous feature for a protection system employed in dynamic electrical systems such as aircraft or aerospace vehicles. In such vehicles, momentary overloading may often result from brief movement of control surfaces or other control elements of the vehicle. The present circuit protection system 200 may allow for construction of aerospace vehicles with relatively light gauge wiring that is sized only for nominal electrical loading. In prior-art aerospace vehicles a heavier-gauged wiring is employed because the prior-art wiring is sized to accommodate overloading conditions without discrimination as to whether the overloading conditions are momentarily or steadily applied.

Consider, for example, a prior-art circuit in an aircraft that is required to carry a nominal load of 20 amps. A 12 gauge wire might be suitable for a nominally loaded 20 amp circuit. However, a prior-art circuit may be constructed with oversized 10 gauge wire. The 10 gauge wire might have a capacity to carry a 40 amp load or a 200% overload without overheating. Oversized 10 gauge wire might be used because a prior-art $i^2t$ based circuit protector may not be able to accurately discriminate between a steadily applied overload and a momentarily applied overload circuit. In order to accommodate routine momentary overloads, the prior-art circuit protector might be set to allow current flow up to 40 amps. If the prior-art circuit protector were set at 20 amps, nuisance tripping might occur during the momentary overloads in excess of 20 amps.

Now consider a 20 amp circuit that may be protected with the inventive system 200 of FIG. 2. In that case, 12 gauge wire may be selected. The 12 gauge wire may safely carry 20 amps and it may safely carry 40 amps during momentary overloads. Because, the protection system 200 may accurately discriminate between momentary overloading and steadily applied overloading, there may be no need to install a 10 gauge wire and a 40 amp circuit protector in an aircraft in order to carry a 20 amp nominal load.

It should be understood, of course, that the foregoing relates to exemplary embodiments of the invention and that modifications may be made without departing from the spirit and scope of the invention as set forth in the following claims.

We claim:

1. Apparatus for providing electrical overload protection for a conductor comprising a controller for providing a switch-opening command based on calculations that are a function of the following: a) ambient temperature to which the conductor is exposed; b) a calculation to determine accumulated energy in the protected conductor; and c) a calculation that is a function of convection cooling of the conductor.

2. The apparatus of claim 1 wherein the controller provides commands based on a solution of an equation $$K_{Amb} = \frac{T_{Amb} * K_{Ref}}{T_{Ref}}$$

where $K_{Ref}$ is an electrical resistance constant at a reference temperature $T_{Ref}$;
where $K_{Amb}$ is an electrical resistance constant as a non-dimensional function of area; and
where $T_{Amb}$ is an ambient temperature to which the conductor is exposed.

3. The apparatus of claim 1 wherein the controller provides commands based on a solution of an equation $$m_{Amb} = 3.38E{-}5 * T_{Amb} - 8.62E{-}5$$

where $T_{Amb}$ is an ambient temperature to which the conductor is exposed; and
where $m_{Amb}$ is a slope of a line correlating surface temperature of the conductor with absolute temperature.

4. The apparatus of claim 1 wherein the controller provides commands based on a solution of an equation $$Q = \frac{1}{0.08 * hA_S} \times \frac{\int (i^2 - hA_S * m_{Amb}) dt}{K_{Amb}}$$

where Q is the accumulated energy within a unit length of protected conductor;
where $hA_S$ is a convection coefficient as a non-dimensional function of surface area of the conductor;
where $K_{Amb}$ is an electrical resistance constant as a non-dimensional function of cross-sectional area of the conductor;
where $m_{Amb}$ is a slope of a line correlating surface temperature of the conductor with absolute temperature;
where i is current in the conductor; and
where t is time.

5. The apparatus of claim 1 further comprising:
a solid-state power switch responsive to commands from the controller.

6. The apparatus of claim 1 further comprising a sensor circuit to provide ambient temperature data to the controller.

7. A solid-state electrical overload protection system comprising:
a solid-state switch for interrupting current in a protected conductor;
a solid-state trip engine;
a current sensing circuit for sensing current in the protected conductor and for providing current data to the trip engine; and a temperature sensing circuit for sensing an ambient temperature to which the protected conductor is exposed and for providing temperature data to the trip engine, wherein the trip engine being interconnected with the solid-state switch, and the trip engine being configured to produce switch opening commands to the solid-state switch based on an algorithm that accounts for the sensed current, convection heat losses of the protected conductor, and the sensed ambient temperature, by performing calculations to determine accumulated energy in the protected conductor and to produce a switch-opening command responsively to the calculations.

8. The apparatus of claim 7 wherein the factor that is dependent on convection heat losses is also dependent on the ambient temperature.

9. The apparatus of claim 7 wherein the trip engine periodically performs the calculations based on the algorithm.

10. A method for providing electrical overload protection for a conductor comprising the steps of:
performing calculations that are a function of ambient temperature to which the conductor is exposed;
performing calculations that are a function of convection cooling of the conductor;
performing calculations to determine accumulated energy in the protected conductor; and
providing a switch-opening command based on all of the calculations.

11. The method of claim 10 further comprising a step of solving an equation $$K_{Amb} = \frac{T_{Amb} * K_{Ref}}{T_{Ref}}$$

where $K_{Ref}$ is an electrical resistance constant at a reference temperature $T_{Ref}$;

where $K_{Amb}$ is an electrical resistance constant as a non-dimensional function of area; and where $T_{Amb}$ is an ambient temperature to which the conductor is exposed.

12. The method of claim 10 further comprising a step of solving an equation $$m_{Amb} = 3.38E-5 * T_{Amb} - 8.62E-5$$

where $T_{Amb}$ is an ambient temperature to which the conductor is exposed; and where $m_{Amb}$ is a sloe of a line correlating surface temperature of the conductor with absolute temperature.

13. The method of claim 10 further comprising a step of solving an equation $$Q = \frac{1}{0.08 * hA_S} \times \frac{\int (i^2 - hA_S * m_{Amb}) dt}{K_{Amb}}$$

where Q is the accumulated energy within a unit length of protected conductor;

where $hA_S$ is a convection coefficient as a non-dimensional function of surface area of the conductor;

where $K_{Amb}$ is an electrical resistance constant as a non-dimensional function of area of the conductor;

where $m_{Amb}$ is a slope of a line correlating surface temperature of the conductor with absolute temperature;

where i is current in the conductor; and where t is time.

14. The method of claim 10 further comprising a step of operating a solid-state power switch responsive to commands from a controller.

* * * * *